Feb. 25, 1969     C. MARSHALL     3,429,596
QUICK-CONNECT COUPLING ASSEMBLY
Filed Aug. 15, 1966
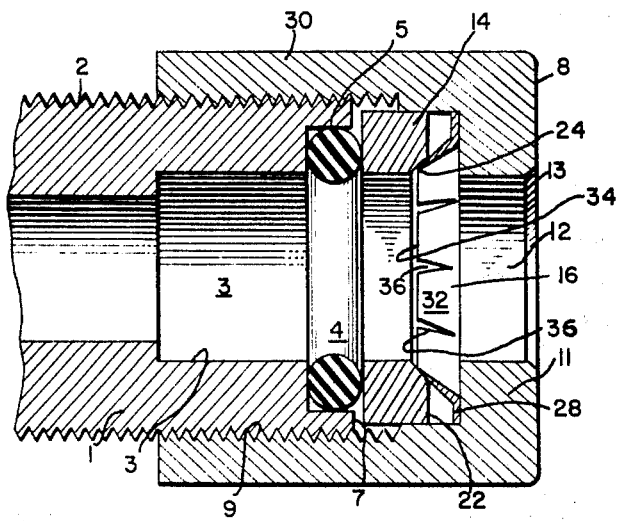
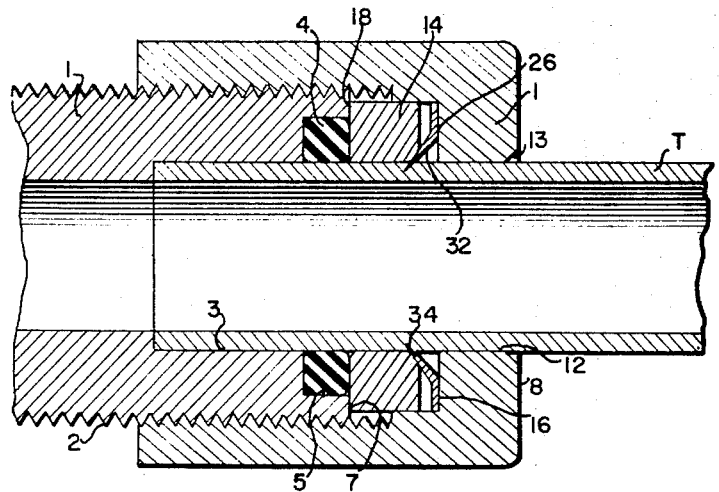
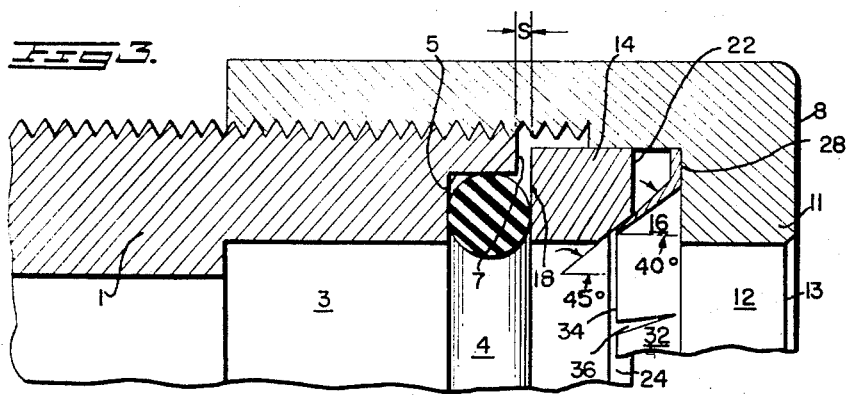
INVENTOR
CHARLES MARSHALL
BY Smith, Michael, Bradford
and Gardiner
ATTORNEYS

United States Patent Office
3,429,596
Patented Feb. 25, 1969

3,429,596
QUICK-CONNECT COUPLING ASSEMBLY
Charles Marshall, Kent, Ohio, assignor to D & G Plastic Co., Kent, Ohio, a corporation of Ohio
Filed Aug. 15, 1966, Ser. No. 572,449
U.S. Cl. 285—340                        3 Claims
Int. Cl. F16l 19/08, 21/04

ABSTRACT OF THE DISCLOSURE

The coupling assembly is defined by a cylindrical counterbored body, the counterbore receiving an O-ring seal, a cylindrical thrust-spacer member abutting against the O-ring and having at its opposite end a beveled cam surface surrounding the interior bore and a thin metallic locking ring having a central segmented conical surface in abutment with the cam surface of the thrust spacer whereby when a hollow cap member mounted on the body and encasing said ring and said spacer is moved axially both the seal and the segmental portion of the locking ring are compressed inwardly to engage the outer peripheral wall of a tube inserted within and passing through the ring, the spacer and at least partially into the coupling body.

---

This invention is directed to a coupling structure. More particularly the invention is directed toward a quick-connect, positive-lock coupling for pipes and tubes formed of any conventional material, and to an improvement of the coupling disclosed and claimed in the prior and copending application of David L. Davenport, Ser. No. 66,014, filed Oct. 31, 1960, now Patent No. 3,312,484.

In the earlier filed application there is disclosed a coupling having several component parts, some having common details to the component parts comprising the present invention, and wherein a tube may be readily connected and locked to the coupling by a so-called "toggle ring" locking means. This locking means comprises a ring formed of a suitable material such as beryllium copper and characterized by its shape which includes an annular outer area lying in a plane perpendicular to an axis passing through the center of the ring and, in turn, surrounding a central, frusto-conical portion provided with radial slits dividing it into segmental locking members. The internal peripheral edge of the ring defined by the segmental locking members is closely related to the outside dimension of the particular tube size for which a given coupling is adapted for use, so that as a tube is inserted into the coupling toward the vertex of a projected cone including the aforesaid frusto-conical segments, the segments are caused to bend outwardly slightly to permit passage of the tube through the ring, as stated, but prevent its removal from the ring due to pull in the opposite direction which causes the segments to draw inwardly around the tube due to their engagement with and into the surface thereof.

In general, the prior invention has proved successful, filling a long-felt need for a fast connection, pressure resistant, easily sealed pipe and tube coupling. However, on occasion "pull out" failures have occurred at higher pressures and it has been found that such failures are attributable to two causes (a) the ring is not formed to proper tolerance, i.e. the interior diametric dimension of the segments is oversized, or (b) the surface of the tube is so slick or slippery as to prevent the inner edges of the segments from biting into the outer surface of the tube or pipe. Also, while the prior coupling is intended to be reusable, such reuse requires complete dis-assembly of the various components followed by cutting off of the end of the tube to remove the locking ring therefrom and, in many cases, replacement of this ring is required to condition the coupling for reuse.

The present improved coupling is designed to overcome the mentioned deficiencies of the prior invention, yet retain its advantages, by providing a quick-connect, reusable pipe and tube coupling which may be applied and removed with all components in assembled relation; which is positively locked in place on the tube end and which possesses all of the advantages of simple use, positive sealing and ease of manufacture which characterizes its predecessor coupling.

Various and numerous objects of the invention, not specifically referred to, but inherent therein and obvious to those skilled in the art, will become apparent when consideration is given to the following detailed description, reference therein being made to the attached drawings, wherein FIGURE 1 is an elevational sectional view through a coupling embodying the details of the invention, before the coupling is used, FIGURE 2 is a view also in section showing the coupling after being sealed and locked on a tube or pipe end, and FIGURE 3 is a greatly enlarged view similar in section and showing the details of the coupling, particularly in respect of its locking and sealing action.

In the description, it will be understood that the word "coupling" is used in a broad sense and includes the joining of two tubes or pipes one to the other, or the joining of tubes or pipes to another member, as for example, to a valve, a receptacle, a nozzle or the like. Also, it will be understood that the components while shown only in sectional view are symmetrical about a central axis passing through the overall assembled struc- Turning now to FIG. 1, it may be seen that the coupling includes a hollow cylindrical body member 1, having a threaded exterior 2. The interior of body member 1 is provided with a pair of counter-bores 3 and 5 in concentric stepped relation. The smaller counter-bore 3 has a diametric dimension which equates approximately to the diameter of the tube or pipe with which it is to be used and same extends axially well into the interior of the body member 1. The larger diameter counter-bore 5 is relatively shallow in an axial direction, extending a short distance into the body 1 along its axis. Counter-bore 5 is of such a diameter as to receive an annular O-ring 4 which is seated therein and which is of a cross sectional volume such as to extend outwardly beyond the planar end 7 at which the body member 1 terminates.

As also shown in FIGS. 1 and 3, a cap 8 having a threaded interior 9 is engaged with and carried on body member 1 and, because of the action of the interengaged threaded surfaces 2 and 9, is rotatable on and simultaneously movable axially along body 1.

Cap 8 is provided with an inturned annular flange 11 having an aperture 12 of a diametric size equal to that of the size of pipe or tubing for which a given coupling is designed. Preferably, the outer edge, i.e. the tube or pipe entry edge of the aperture 12 is rounded or beveled at 13 to facilitate forced entry and centering of the tubular member in and through the aperture 12 with a minimum of effort.

Housed within the cap 8, between the inner face of flange 11 and the annular terminal end 7 of coupling body 1, are a thrust-seal ring 14 and a toggle ring locking member 16, respectively.

Thrust-seal ring 14 is essentially a cylindrical ring having a planar face 18 adapted to abut against the O-ring 4 and a similar annular face 22 in opposing relation with flange 11 of cap 8. The inner edge of face 22 is provided with a frusto-conical or rounded bevel 24 having a vertex angle of approximately 45°.

Also housed within cap 8, between flange 11 of cap 8 and face 22 of thrust-seal ring 14, is the locking ring, 16 formed preferably from stainless steel stock having resilience and bendable properties. Locking ring 16 is comprised of an outer annular peripheral area 28 lying in a plane perpendicular to the central axis of the coupling. The inner peripheral edge of this area merges into a frusto-conical central area 32 bounded by a relatively sharp inner peripheral edge 34. Extending inwardly from edge 34 are a plurality of generally V-shaped slits 36 which divide the frusto-conical portion of the ring into what may be described as a plurality of individually movable segments. These segments are preferably evenly distributed, i.e. the slits are spaced apart equal distances, one from the other, around area 32, to assure equal action of each segment when the coupling is used as will be apparent from further description.

It should be noted that the vertex angle of frusto-conical area 32 may be somewhat different than the beveled edge 24 of thrust ring 14. For example, where the vertex angle of the bevel 24 is about 45°, the vertex angle of the frusto-conical area 32 of ring 26 will be about 40–44°, see FIG. 3. In any event the relationship between these two conical surfaces is such that as locking ring 16 is pushed toward thrust ring 14 the conical area of the former will be squeezed inwardly to reduce the effective diameter of the internal edge 34.

Again directing specific attention to FIG. 3, and in particular to the O-ring 4, it will be noted that this ring has sufficient cross sectional volume so as to seat firmly in counterbore 5 and to extend slightly outwardly beyond annular face 7 of coupling body 1. It has been found that the volume of the O-ring, in an unstressed condition, should exceed the volume defined by the groove formed between counter-bore 5 and face 18 of thrust-seal ring when same is in face-to-face contact with the annular end 7 of coupling body 1, by about 20 to 30%. Also it has been found that O-rings of a suitable compressible material, usually called rubber, in a very broad sense, and having a hardness of 60 to 90 durometer, on the usual Shore A scale, function quite satisfactorily in most applications of the fitting over a fairly wide range of pressures.

The use and mode of application of the coupling is relatively simple. As supplied to a user or as applied by a user, the components are assembled on coupling body 1 with thrust-spacer ring 14 and the locking ring 16 loosely seated and housed in concentric relation within cap 1. O-ring 4 is also seated in counter-bore 5. Due to the volume of the O-ring a space S is defined between the annular faces 7 of body 1 and 18 of thrust spacer 14. Cap 8 is only threaded on body 1 far enough to keep the parts assembled but neither O-ring seal 4 or the frusto-conical area of locking ring 8 is stress at this time.

A tube or pipe T of a diameter for which the fitting is designed; note that the internal diameters of counter-bore 3, thrust seal ring 14, and aperture 12 in cap 8 are equal to the external diameter of the tube; is cut off square and is inserted into the loosely assembled coupling through the various openings. Bevel 13 in cap 8 assures easy and correctly centered insertion so that the only resistance to insertion of the tube is that frictional force generated as the tube is pushed through the O-ring seal which is still unstressed or only lightly stressed as the tube finally seats within counter-bore 3 in coupling body 1 (see FIG. 3).

With the tube thus inserted, cap 8 is rotated, lands 30 being provided thereon for engagement by a suitable wrench or the like, if required, with the result that it is also moved axially along body 1. Annular flange 11 exerts pressure on the annular portion 28 of toggle or locking ring 16, this axial force being transmitted to the thrust-seal ring 14 by abutment of the frusto-conical area 32 of locking ring 16 with bevel edge 24 of thrust-seal ring 14, and to the O-ring seal by engagement of the annular face 18 of thrust-seal ring 14 therewith.

The O-ring begins to deform under compression, the space S diminishing, until the O-ring is deformed and substantially becomes rectangular in cross section, completely filling counter-bore 5 and squeezing toward and into tight sealing engagement with the exterior surface of tube T.

Concurrently with this action, due to the deformable nature and comparative thinness of the frusto-conical area 32 of locking ring 16 and the force couple being exerted thereon by flange 11 of cap 8 and their engagement with the beveled edge 24 of the thrust-spacer ring 14, the individual segments begin to bend and straighten toward the plane of the annular peripheral area 28 of the ring to thus reduce the effective diameter of edge 34 with the result that these edges bite into and grip the outer surface of the pipe or tube T.

Once the tube is gripped continued rotation of cap 8 serves primarily to further compress O-ring 4, thus assuring of a complete seal and firm unyielding locking of the tube within the coupling.

In FIG. 3, the coupling is shown drawn together with almost maximum tightening of cap 8, the annular faces 7 and 18 of body 1 and thrust-seal ring 14, respectively, being in face-to-face engagement. It should be noted that it is not always necessary or desirable to tighten the cap 8 to this extent because in many, in fact most, instances, adequate sealing and gripping can be effected by merely finger tightening of cap 8 on body 1 after insertion of tube T in the coupling. Thus continued tightening, unless the seal is leaking, is to no real advantage once the frusto-conical area 32 of the locking ring has been stressed to cause the edge 34 to grip the tube or pipe.

If the tube is to be removed, it is only necessary to backoff cap 8, the O-ring 4 returns to its original shape, and because of the characteristics of the material from which it is made the toggle or locking ring 14 returns to its original shape as the segments 32 are moved away from edge 24 of ring 14 and the tube T may be easily withdrawn by an axial pull from its seal in counter-bore 5 and free of the coupling. The coupling itself is, then, available for reuse on the same or other tubing as may be desired.

In describing the invention reference has been made to the materials of the O-ring and locking ring. In this connection it should be noted that coupling body 1, thrust-seal ring 14 and cap 8 may be cast of brass or other metal, or, moulded of a suitable high impact plastic. Hence, no restriction as to materials is contemplated or should be implied herein. Also, while cap 8 has been shown as threaded on body 1, it is possible, particularly for low pressure applications, that threads 2 and 9 could be dispensed with, in which case cap 8 would be moved axially of body 1 by the application of an axial force and the two brazed, in the case of metal, or heat and/or solvent sealed together, as in the case of plastic. This latter arrangement, however, is not preferred because the coupling no longer is considered truly reusable and once unitized, if a leak should occur, the only solution resides in replacement of the entire coupling coupled with the necessity of removing the coupling by cutting off the end of tube T.

What is claimed is:

1. In a coupling comprised of a hollow coupling body having a central bore, a concentric counterbore in one end opening outwardly of the body; a resilient deformable seal member disposed in said counterbore and having an uncompressed cross sectional volume great enough so as to extend partially outwardly of the end of the coupling body; a thrust spacer member having a flat, annular face, said face being concentric with the bearing against the uncompressed seal member prior to final make-up of the coupling; a locking ring concentric with and abutting the opposite end of said thrust spacer member, said locking ring including a central, frusto-conical segmented flexure area having a circular gripping edge and a flat annular peripheral area concentric with the outer opposite end of the thrust spacer member; a movable cap mounted on said coupling body for axial movement relative thereto, said cap having an inturned annular end wall surrounding a central aperture therethrough, said end wall being in engagement with the outer area of said locking ring; the improvement wherein the outer peripheral edge of said locking ring engages and is positioned by the inner cylindrical wall of said cap, and the diameter of said gripping edge of said locking ring is larger than the diameter of the outer surface of a conduit to be inserted therethrough before said cap is moved axially along said body; said thrust spacer member adjacent said ring including a beveled peripheral edge surounding the central aperture therein and engaging said segmented, frusto-conical flexure area of said ring so that after a conduit is inserted through the back wall of the cap, said locking ring, said thrust spacer ring and into the bore of said coupling body, axial movement of said cap causes said flexure area to bear against thrust spacer at said inner beveled edge thereof and said spacer to bear against said seal member whereby the diameter of the gripping edge of the locking ring is reduced to permit engagement of said edge with the conduit while simultaneously pressure against the seal causes same to uniformly distort with the inner portion thereof contracting radially inwardly to engage and seal against the outer surface of the conduit and said flat annular peripheral area of said locking ring is axially spaced from said thrust spacer member after said axial movement of said cap.

2. A coupling as defined in claim 1 wherein the cap is threadedly engaged on and with the coupling body.

3. A coupling as defined in claim 1 wherein the unstressed volume of the sealing member is at least 20 to 30% greater than the volume of the groove defined by the counter-bore in said coupling body.

References Cited

UNITED STATES PATENTS

| | | | |
|---|---|---|---|
| 1,822,056 | 9/1931 | Noble | 285—340 |
| 2,201,372 | 5/1940 | Miller | 285—340 X |
| 3,219,751 | 11/1965 | Pfendler et al. | 285—340 X |
| 2,999,701 | 9/1961 | Blair et al. | 285—340 |
| 2,284,365 | 5/1942 | Briegel | 285—340 |
| 3,291,510 | 12/1966 | Kody | 285—340 |
| 3,312,483 | 4/1967 | Leadbetter et al. | 285—340 |
| 3,312,484 | 4/1967 | Davenport | 285—340 |

FOREIGN PATENTS

| | | |
|---|---|---|
| 895,461 | 5/1962 | Great Britain. |
| 1,335,121 | 7/1963 | France. |

CARL W. TOMLIN, *Primary Examiner.*

D. W. AROLA, *Assistant Examiner.*

U.S. Cl. X.R.

285—27, 423